Jan. 9, 1945.  M. L. DONNELLAN  2,366,892
AERONAUTICAL TAKE-OFF GEAR
Filed April 19, 1943     2 Sheets-Sheet 2
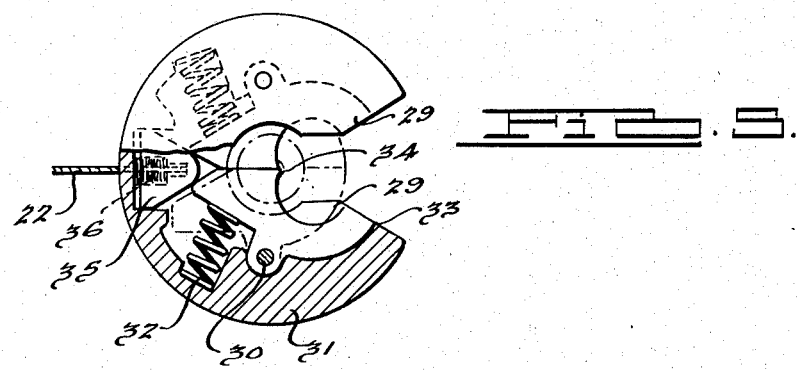
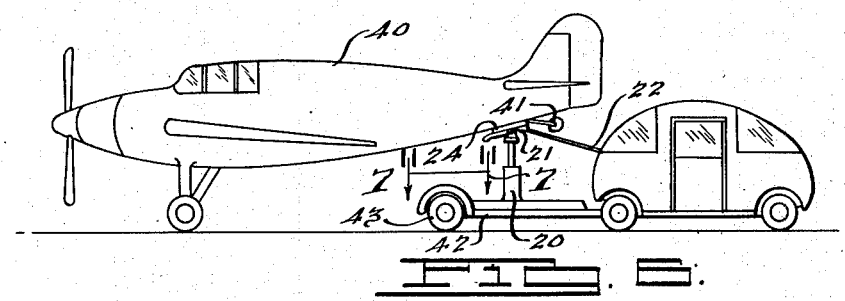
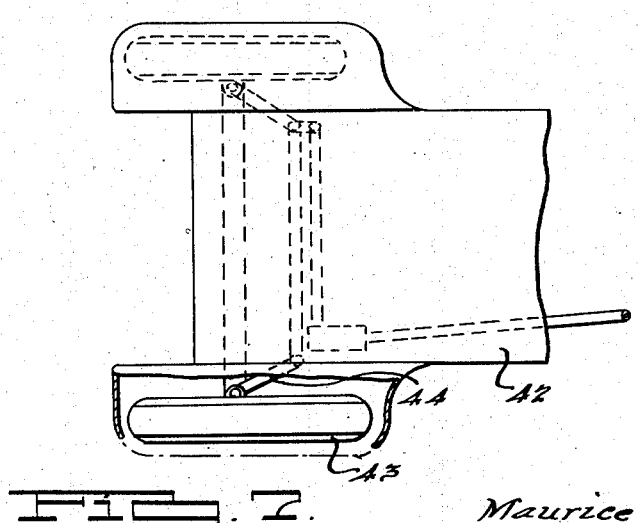
INVENTOR
Maurice L. Donnellan.
BY Gray and Smith
ATTORNEYS Patented Jan. 9, 1945

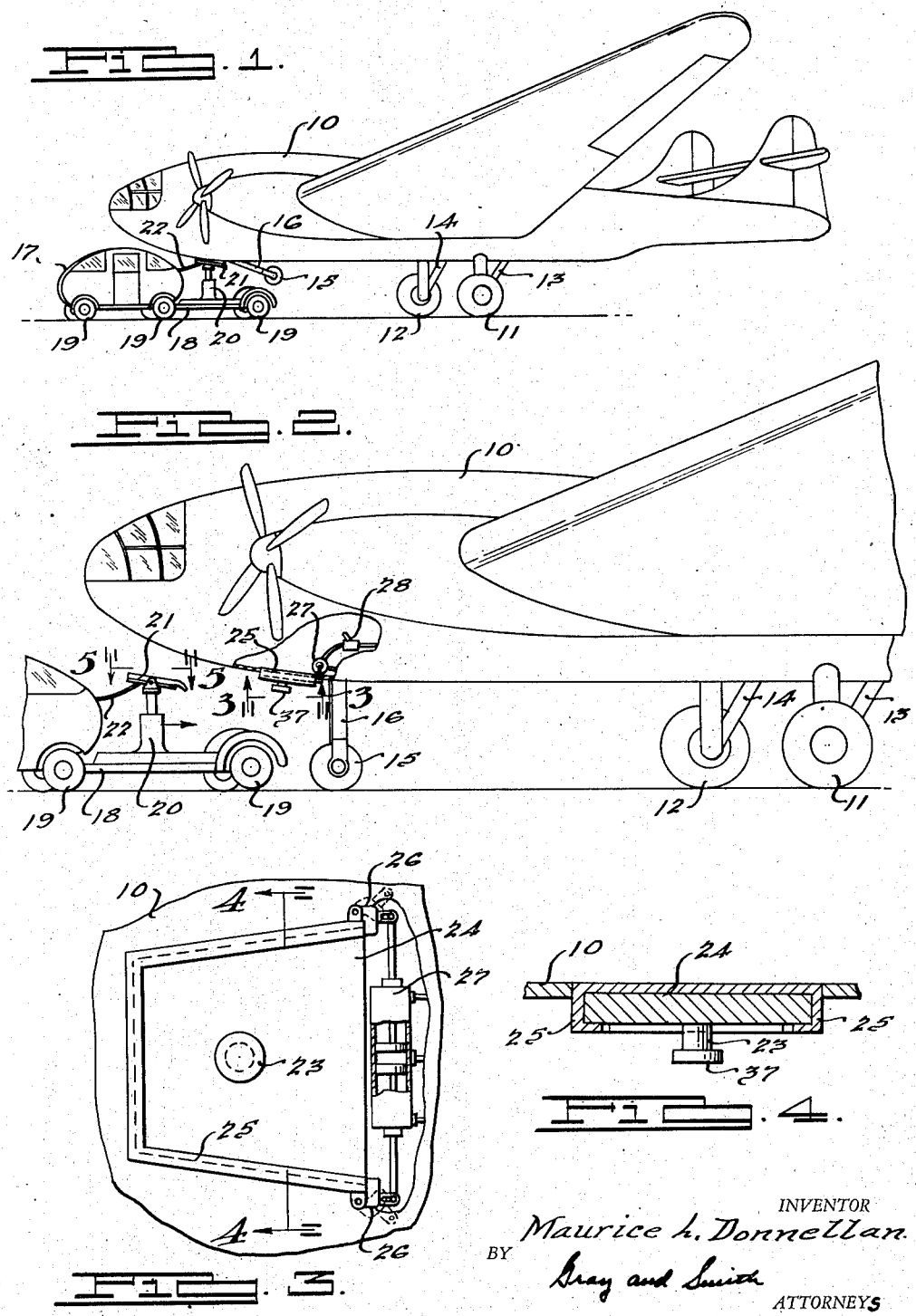

2,366,892

UNITED STATES PATENT OFFICE 2,366,892

AERONAUTICAL TAKE-OFF GEAR

Maurice L. Donnellan, Ypsilanti, Mich.

Application April 19, 1943, Serial No. 483,613

4 Claims. (Cl. 244—63)

The present invention relates to an aeronautical take-off device and more particularly to a device which is adapted to assist in the take-off of air borne vehicles.

As is known, an air borne vehicle of the rigid wing type is lease efficient mechanically during the take-off period. At this time the weight of the plane and its load are supported from the landing gear or the hull of the plane as distinguished from the support of the plane and its load from the wing structure as soon as the vehicle is air borne. At the start of the take-off the vehicle and its load are stationary. It is therefore necessary to have a rapidly accelerating movement of the vehicle to attain flying speed and lift the vehicle into the air from a take-off space which even in areas where space is limited must be of relatively large dimensions. The so-called take-off run, usually requires the entire power output of the motors because of the excessive power demands during the take-off, while actual flight requires considerably less than the entire power output of the motors.

It is, therefore, among the objects of the present invention:

First, to provide a novel aeronautical take-off device to furnish additional power to the plane during the take-off period.

Second, to provide a novel aeronautical take-off device which is readily attached to the plane while it is not air borne but which is detached from the plane as soon as take-off speeds are attained, and the plane becomes air borne.

Third, to provide a novel take-off device consisting of a vehicle having ground engaged wheels which are power driven independently of the motors of the aircraft, thereby permitting greater loads at take-off from a take-off area of a predetermined dimension without requiring the use of additional motors in the plane itself.

Fourth, to provide a device particularly adapted for handling and maneuvering ground borne aircraft and which is effective to launch either a power driven airplane or a motorless glider from a take-off area of restricted dimensions.

Fifth, to provide an aeronautical take-off device which will permit the design of relatively higher speed wings with less emphasis on the high lift design than is required under the conditions of a conventional take-off.

Sixth, to provide a novel aeronautical take-off device in which the horse power available for the take-off may be selectively increased as may be required to assume proper take-off.

Seventh, to provide a device to assist in the take-off of air borne vehicles either singly or in multiples, such for example as a train of either motor driven planes or motorless gliders.

Eighth, to provide a device adapted to supply auxiliary power to a normally airborne vehicle during the take-off and in which the power is efficiently applied through ground contacting power driven wheels.

Other objects of this invention will appear in the following description and appended claims, reference being had to the accompanying drawings forming a part of this specification wherein like reference characters designate corresponding parts in the several views.

Fig. 1 is an elevation showing the aeronautical take-off device of the present invention attached to a conventional type of land plane.

Fig. 2 is a fragmentary view in side elevation showing the aeronautical take-off device detached from a plane of conventional type.

Fig. 3 is a plan view partially in section taken substantially on the line 3—3 looking in the direction of the arrows of Fig. 2.

Fig. 4 is a sectional view taken substantially on the line 4—4 looking in the direction of the arrows of Fig. 3.

Fig. 5 is a top plan view partially in section looking in the direction of the arrows 5—5 of Fig. 2.

Fig. 6 is a side elevation showing a modified form of aeronautical take-off device embodying the present invention in position to assist in the take-off of a different type of conventional land plane.

Fig. 7 is a fragmentary top plan view partially in section taken substantially in the direction of the arrows 7—7 of Fig. 6.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, particularly to Figs. 1 and 2, the numeral 10 designates a conventional type of airplane having a landing gear which, as here shown, comprises a plurality of ground engaging wheels 11 and 12, each of which is mounted on the airplane by retractable plane supporting struts or members 13 and 14. A front wheel 15 in the present instance a so-called "nose" wheel is mounted at the forward end of the plane on a retractable supporting leg 16. When used with a plane having this type of landing gear, the take-off device of the present invention comprises an articulate vehicle consisting of a cab 17 and a trailer 18. A suitable propulsion device, for example an internal combustion engine, is provided in the take-off vehicle and is connected in driving relation to some or all of the ground-engaging wheels 19 of the vehicle. The propulsion device acts primarily for the propulsion of the said articulated take-off vehicle, and when this is connected with the plane as shown in Fig. 1, sufficient power is provided to assist in the movement of the plane along the ground while it is supported on the ground-engaging wheels 11 and 12. In this position the ground-engaging wheel 15 is in the semi-folded or semi-retracted position as shown in Fig. 1. Details of such propulsion devices and driving connections to the ground engaging wheels 19, are not shown since such devices and connections are well known to those skilled in the art, and any desired conventional types of such devices may be used for the purpose intended.

Mounted on the trailer 18 of the articulated vehicle is an hydraulically operated telescoping jack 20, carrying at its upper end the lower half 21 of a tiltable fifth wheel coupling member. A control device 22 extends from the lower half 21 of the tiltable fifth wheel coupling member to the cab 17 and permits the operator from within the cab 17 to control the coupling and uncoupling of the fifth wheel with the depending king-pin 23, which is carried by the plane. The king pin 23 is carried on a slidable plate 24 which is carried in ways 25 secured to the airplane 10 at a suitable point on the fuselage (which is sufficiently reinforced to withstand, without damage to the fuselage structure, the strains resulting from the take-off operation). The sliding plate 24 is releasably retained in the ways 25 by a plurality of movable locking dogs or latches 26, which are connected, as shown in Fig. 3, with a suitable device for moving the dogs to locking and unlocking position. In the present instance this comprises a hydraulically actuated member 27 controlled by control means 28 located in the interior of the plane cabin and adapted to move the said locking dogs 26 into locking and unlocking position relative to the plate 24.

Thus when the plane and take-off device are coupled as shown in Fig. 1, either the operator of the plane or the operator of the take-off vehicle may disengage the fifth wheel connection and free the plane from the vehicle for separate operation. The plate 24 is preferably in the shape of a flat nosed wedge member with the inclined sides tapering inwardly toward the nose portion of the plane. The ways 25 correspond in shape to the shape of the plate 24. Thus when take-off speed is attained the hydraulic mechanism 27 is operated by the control means 28 from within the cabin of the plane and the locking dogs are moved to the open position as shown by the dotted line in Fig. 3. When in this position, the plane as it picks up speed and exceeds the speed of the take-off device, will over-run the take-off device, and due to the shape of the ways 25 and the plate 24, will leave the plate 24 with the depending king-pin 23 locked in the coupling device provided in the lower half 21 of the tiltable fifth wheel carried by the telescoping jack 20.

If, however, it should be desired to release the plane from the take-off device, and leave the plate 24 and the depending king-pin 23 attached to the plane, this may be accomplished by operation of the control member 22 from the cab 17 of the take-off device to uncouple the king-pin 23 from the coupler forming a part of the fifth wheel mechanism.

The coupling unit carried by the lower part 21 of the fifth wheel may be of any desired conventional design, or as shown in greater detail in Fig. 5, the coupler may comprise a pair of pivotally mounted opposed jaws 29, each having a pivot point 30 on the coupler housing 31. The jaws 29 are spring pressed by springs 32, which exert a force on the jaws 29, tending to keep them in the open position as shown by the solid line portions of Fig. 5.

When the king-pin 23 enters the slot 33 in the fifth wheel plate, a force is exerted on the heel portions 34 of the jaws 29, which force, when sufficient to overcome the force of the spring 33, causes the jaws 29 to close around the king-pin 23 and occupy the position shown in the dotted line of Fig. 5. When the jaws 29 occupy this closed position, the locking wedge 35 is forced between the heel portions of the jaws, causing them to be retained in the closed position. The wedge 35 is propelled into position between the jaws 29 by the spring 36 and is retracted from the jaw-locking position by a force exerted thereon through the control element 22.

The king-pin 23 is provided with a flange 37 at its depending end, and the jaws 29 are so dimensioned and positioned that when closed they occupy a position surrounding the king-pin 23 between the flange 37 and the plate 24, which prevents separation of the king-pin by movement in a vertical plane while the coupler jaws are closed. The throat of the top plate of the coupler is preferably formed in an outwardly flaring wedge as shown in Fig. 5 so as to assist in guiding the king-pin 23 into position for engaging the heel portions of the jaws 29 during the coupling operation.

In the modified embodiment of the invention shown in Fig. 6, the take-off vehicle is connected at the rear of the plane. As here shown the plane 40 is provided with a tail-landing wheel or skid 41. With this type of plane the tail portion of the plane contacts the ground and the nose portion is held away from the ground, as distinguished from the type of plane shown in Figs. 1 and 2 where the tail portion is supported off the ground and the nose portion is supported from the ground by the nose wheel 15. In the modification of the device shown in Fig. 6 the take-off vehicle carries an hydraulically operated telescoping jack and the lower half of the fifth wheel corresponding respectively to the jack 20 and the lower half of the fifth wheel 21 previously described. A coupler similar to that previously described is carried in the said lower half 21 of the fifth wheel and its operation is controlled by the control member 22 as previously described. In the present instance the tail portion of the plane 40 carries the plate 24 and the depending king-pin 23, which are constructed and function as previously described in connection with the embodiment of the invention shown in Figs. 1 through 5. In the modified form of the invention certain structural modifications are required to enable the take-off vehicle to function most efficiently in the manner intended. In the present instance the take-off vehicle as shown in Fig. 6 comprises a platform truck 42 having forward steering wheels 43 and steering mechanism 44 which is controlled from the rear cab 45. The driving force is transmitted to the vehicle through some or all of the ground-engaging wheels 43 as may be desired.

In either form of the take-off device herein disclosed the device is moved into position for coupling to the plane while the plane is supported by its landing gear. In this position the hydraulically actuated jack 20 is telescoped to its closed or retracted position and in this position is pushed under the coupling plate on the plane. The coupling is then completed and the take-off vehicle is connected with the depending king-pin 23 carried by the plane. The hydraulic jack is then actuated to raise the lower half of the fifth wheel and transfer a portion of the load of the plane to the fifth wheel mechanism and through it to the take-off vehicle. When the weight of the plane is thus transferred to the take-off vehicle, the forward landing gear in the case of the construction shown in Figs. 1 and 2 may be retracted into the position shown in Fig. 1 so that the plane and the take-off device become in effect a single articulated unit. As shown in Fig. 6 the rear wheel 41 of the plane may be similarly retracted and the weight of the tail portion of the plane would be carried by the take-off device.

In either instance it will be seen that the take-off device of the present invention provides additional power for moving the plane while it is ground borne and this, together with the propulsive effort of the engines of the plane, will cause the plane to have a very rapid acceleration and to attain flying speed in a much shorter distance than without the use of the take-off device. The device herein disclosed will, therefore, assist in the efficient movement of planes while they are land borne and furnishes additional power facilities during the take-off. The device is readily detached from the plane as soon as take-off speeds are attained, and the plane becomes air borne. The auxiliary power is applied through the wheels of the take-off device and thus the plane when air borne is not encumbered with the additional weight which would be required if additional motors were mounted thereon for use during the take-off. The device will, therefore, permit the handling and maneuvering of aircraft from take-off areas of restricted dimensions. The device also permits a variation in design of the wing structure allowing the use of wings having relatively high speed characteristics without impairing the load carrying characteristics.

In the event that it is desired to launch a motorless glider or a train either of power driven or motorless aircraft, this may be done by the use of a multiple of take-off devices of the present invention, which devices may be controlled either independently or from a single control source.

The present application is related to my co-pending application Serial No. 483,612, filed April 19, 1943, entitled "Aeronautical take-off gear."

I claim:

1. An aeronautical take-off device comprising a motor driven articulated vehicle including a tractor vehicle and a separate vehicle connected to said tractor vehicle for movement therewith, and an adjustable selective coupling member carried on said separate vehicle for selectively coupling and uncoupling said vehicle and an airplane, and comprising a separate fifth wheel member, the lower portion of which is mounted on the take-off device and the upper portion of which is selectively carried by the airplane, a coupler mounted in the lower portion of said fifth wheel, and a kingpin carried by the upper portion thereof, and means for selectively detaching the upper portion of the fifth wheel and the king-pin from the airplane.

2. An aeronautical take-off device comprising a motor driven articulated vehicle including a tractor vehicle and a separate vehicle connected to said tractor vehicle for movement therewith, and an adjustable selective coupling member carried on said separate vehicle for selectively coupling and uncoupling said vehicle and an airplane and including an hydraulically operated jack mounted on said separate vehicle and a coupling device carried in part on said jack and in part on the airplane, and comprising a separate fifth wheel member, the lower portion of which is mounted on the take-off device and the upper portion of which is selectively carried by the airplane, a coupler mounted in the lower portion of said fifth wheel, and a king-pin carried by the upper portion thereof, and means for selectively detaching the upper portion of the fifth wheel and the king-pin from the airplane.

3. An aeronautical take-off device comprising a motor driven articulated vehicle including a tractor vehicle and a separate vehicle connected to said tractor vehicle for movement therewith, and an adjustable selective coupling member carried on said separate vehicle for selectively coupling and uncoupling said vehicle and an airplane, and comprising a separate fifth wheel member, the lower portion of which is mounted on the take-off device and the upper portion of which is selectively carried by the airplane, a coupler mounted in the lower portion of said fifth wheel, and a king-pin carried by the upper portion thereof, and means for selectively detaching the upper portion of the fifth wheel and the king-pin from the airplane, and including an hydraulically actuated latching and unlatching device controlled by control means located within the airplane.

4. An aeronautical take-off device comprising a motor driven articulated vehicle including a tractor vehicle and a separate vehicle connected to said tractor vehicle for movement therewith, and an adjustable selective coupling member carried on said separate vehicle for selectively coupling and uncoupling said vehicle and an airplane and including an hydraulically operated jack mounted on said separate vehicle and a coupling device carried in part on said jack and in part on the airplane, and comprising a separate fifth wheel member, the lower portion of which is mounted on the take-off device and the upper portion of which is selectively carried by the airplane, a coupler mounted in the lower portion of said fifth wheel, and a king-pin carried by the upper portion thereof, and means for selectively detaching the upper portion of the fifth wheel and the king-pin from the airplane, and including an hydraulically actuated latching and unlatching device controlled by control means located within the air plane.

MAURICE L. DONNELLAN.